United States Patent [19]

Maruyama

[11] Patent Number: 5,794,104
[45] Date of Patent: Aug. 11, 1998

[54] METHOD AND APPARATUS FOR IMAGE PROCESSING CAPABLE OF GENERATING MULTIPLE IMAGES OF VARYING DIMENSIONS

[75] Inventor: Eiko Maruyama, Toyokawa, Japan

[73] Assignee: Minolta Co., Ltd., Osaka, Japan

[21] Appl. No.: 688,137

[22] Filed: Jul. 29, 1996

[30] Foreign Application Priority Data

Jul. 28, 1995 [JP] Japan .................. 7-192722

[51] Int. Cl.⁶ .................................. G03G 15/36
[52] U.S. Cl. .............. 399/183; 359/448; 399/182; 399/194; 399/196
[58] Field of Search .................. 399/130, 182, 399/183, 194, 196; 358/448, 452, 453

[56] References Cited

U.S. PATENT DOCUMENTS

| | | | |
|---|---|---|---|
| 4,707,126 | 11/1987 | Ohshima et al. | 399/194 X |
| 4,914,475 | 4/1990 | Sugishima et al. | 399/183 |
| 5,016,051 | 5/1991 | Morikawa et al. | 399/196 X |
| 5,049,932 | 9/1991 | Sumida | 399/183 |
| 5,099,336 | 3/1992 | Moriya | 399/196 X |
| 5,475,475 | 12/1995 | Kohtani et al. | 399/196 X |

FOREIGN PATENT DOCUMENTS

| | | |
|---|---|---|
| 4-23866 | 4/1992 | Japan . |
| 5-112054 | 5/1993 | Japan . |

*Primary Examiner*—Sandra L. Brase
*Attorney, Agent, or Firm*—McDermott, Will & Emery

[57] ABSTRACT

An image processing apparatus designates image area on the original. A shifting device shifts the image area by predetermined amount. An outputting device outputs the image data corresponding to the image area and the image data corresponding to the shifted image area.

27 Claims, 14 Drawing Sheets

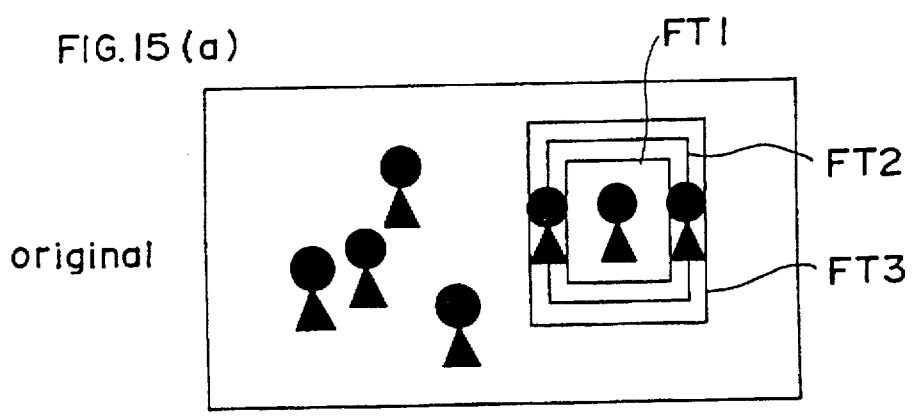
FIG.15(a) original
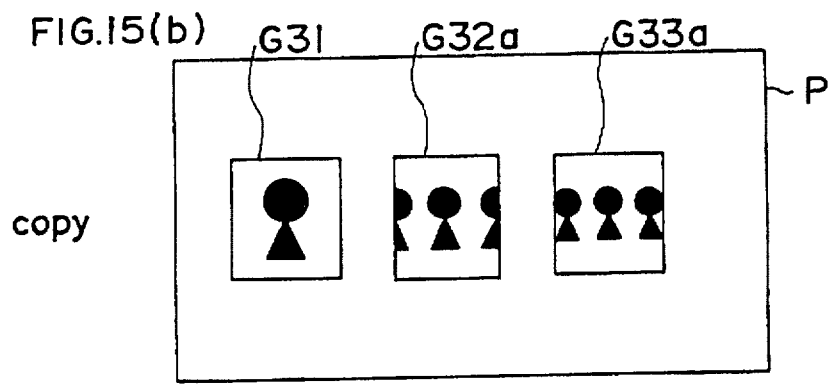
FIG.15(b) copy
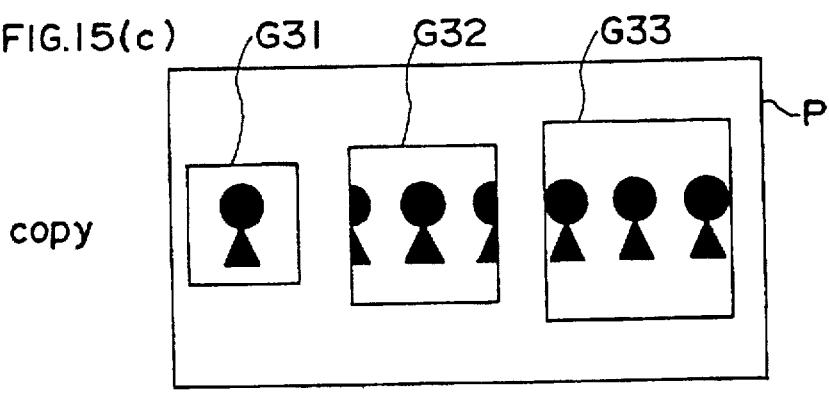
FIG.15(c) copy
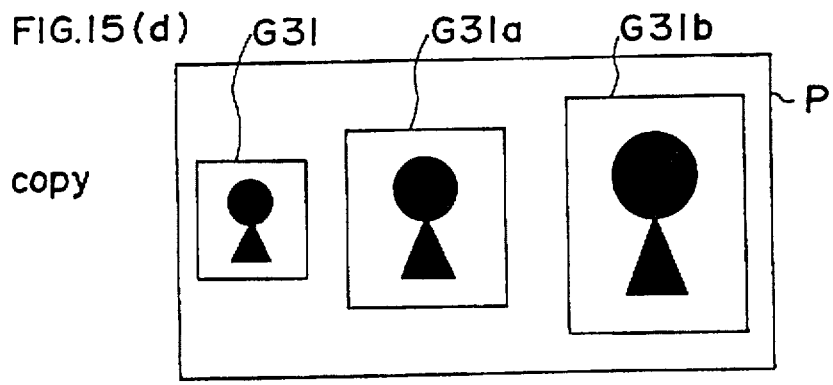
FIG.15(d) copy

METHOD AND APPARATUS FOR IMAGE PROCESSING CAPABLE OF GENERATING MULTIPLE IMAGES OF VARYING DIMENSIONS

BACKGROUND OF THE INVENTION

1. Field of the Invention

The present invention relates to an image processing apparatus having a trimming function, specially a digital copier that converts an original image into digital image data and forms a copy image based on said image data.

2. Description of the Related Art

The trimming function is widely known as an editing/duplicating function of digital copiers. It involves extracting the image of a portion of the original (the trimming area) and making its duplicate. A board-like input device called an editor is often employed as the means to designate the trimming area.

Furthermore, some digital copiers have an image repeat function in which multiple copy images are printed in a single column or in multiple columns on a single sheet of paper. Where the image repeat function is used, the copy magnification is set in accordance with the relative sizes of the original and the paper and the number of repeats desired. For example, where four copy images are to be printed in two columns and two lines, on paper that is the same size as the original, the copy magnification is set at approximately 0.5.

One of the additional functions of such copiers is the monitor copy function. This involves changing the image quality (mainly the color tone) for a portion of the original image and copying of said portion onto a single sheet of paper side by side (Japanese Laid Open Patent Hei 6-334854). By simply designating one monitor image among the multiple monitor images printed with different image qualities, the user can complete adjustment of the image quality.

When performing copying using the trimming function described above, where the original is character-based, such as a document, newspaper, or book, the matter to be copied (the information to be extracted) is relatively clear. In other words, the user can determine the size and position of the trimming area without difficulty.

On the other hand, where for example a portion of a photograph is to be copied in enlargement, the impression of the copy image may vary depending on its composition. As a result, in trying to find the best composition, the user often has to repeatedly change the trimming area and perform copying. This repeated copying is wasteful in terms of consumption of both paper and time.

The purpose of the present invention is to create a copying mode in which the reference information for an area designated as the trimming area is output, through which the practicality of the trimming function is improved.

SUMMARY OF THE INVENTION

A first object of the present invention is to provide a copier in which, when the user extracts a needed partial area of the original, there is no wasteful repetition of the image creation process.

A second object of the present invention is to provide a copier in which, when the user extracts a needed partial area of the original, user operation may be reduced through automatic setting of multiple different areas based on the designated area.

A third object of the present invention is to provide a copier in which, when the user extracts a needed partial area of the original, the user may easily select a needed area of the original by automatically setting multiple different areas based on the designated area and outputting images that correspond to said multiple different areas onto a single sheet of paper.

A fourth object of the present invention is to provide a copier in which, when the user extracts a needed partial area of the original, user operation may be reduced by automatically setting multiple areas of different sizes surrounding the designated area.

A fifth object of the present invention is to provide a copier in which, when the user extracts a needed partial area of the original, the user may easily select a needed partial area of the original by automatically setting multiple areas of different sizes surrounding the designated area and outputting onto a single sheet of paper images corresponding to said multiple areas of different sizes.

These and other objects, advantages and features of the invention will become apparent from the following description thereof taken in conjunction with the accompanying drawings which illustrate specific embodiments of the invention.

BRIEF DESCRIPTION OF THE DRAWINGS

FIG. 15 is a simplified drawing showing one example of Magnify and Repeat.

In the following description, like parts are designated by like reference numbers throughout the several drawings.

DESCRIPTION OF THE PREFERRED EMBODIMENT

Figure 1:
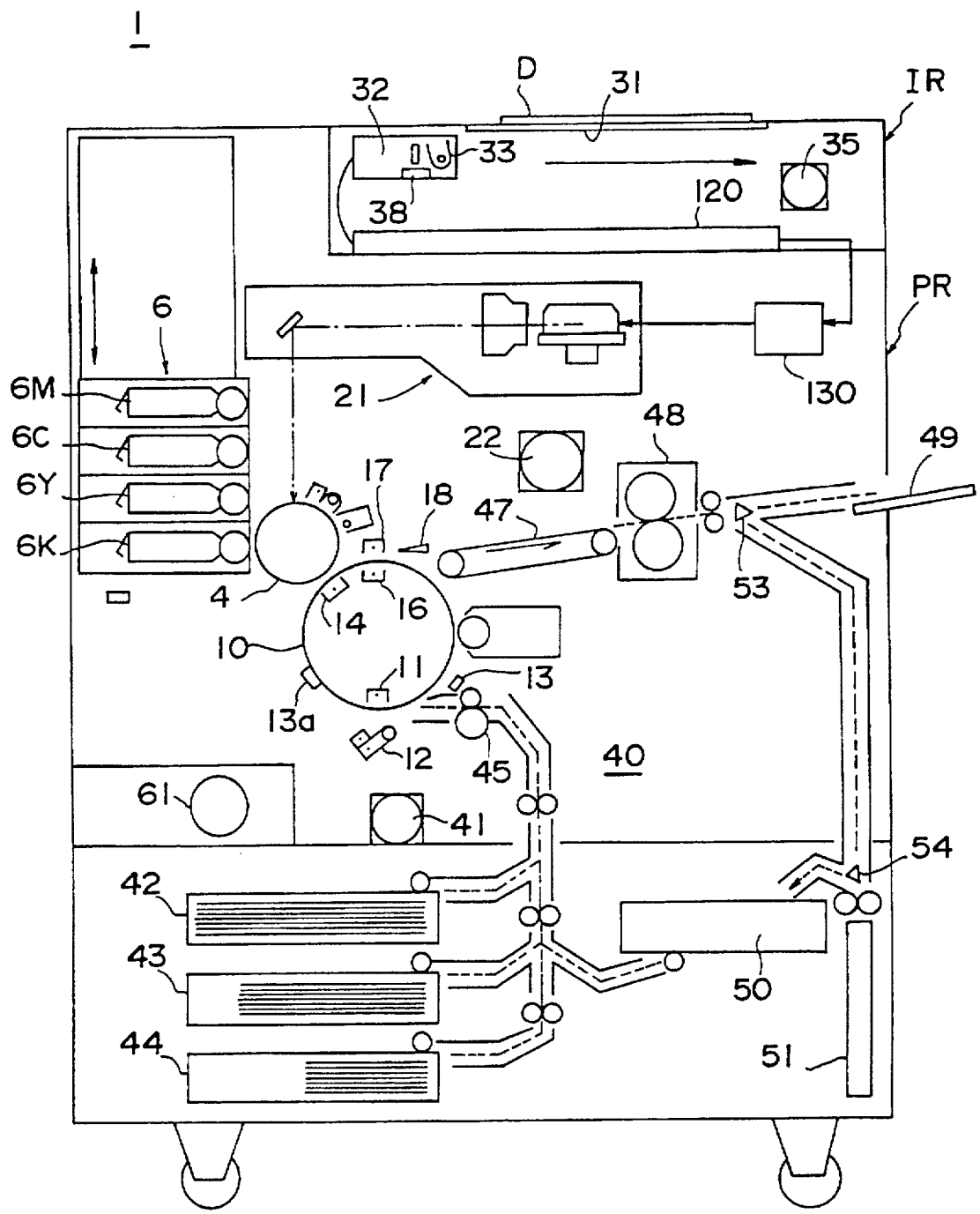
FIG. 1 is a front elevation showing the construction of the copier relating to the present invention.

FIG. 1 is a front elevation showing the construction of copier 1 relating to the present invention.

Copier 1 is a digital color copier that can perform both monocolor and full-color copying, and comprises image reader unit IR and printer unit PR.

Image reader unit IR is a mechanism to read an original based on the line scanning method. It performs scanning of original D placed on platen glass 31 by means of scanner 32 and reads the image of the original, after the carrying out of color separation of said image into three colors (R, G, B), by means of one-dimensional image sensor 38 comprising a CCD. Photoelectric conversion signals from image sensor 38 are sent to print head controller 130 of printer unit PR as electrophotographic process exposure control signals after being converted into digital data by image processor 120. Scanner 32 is driven by pulse motor 35.

Printer unit PR comprises an image formation system that forms a copy image by means of an electrophotographic process, as well as a mechanism for housing and feeding copying paper.

The image formation system has print head 21 that uses a semi-conductor laser as the exposure light source, photosensitive drum 4 that serves as a latent image carrier, developing unit 6, and transfer drum 10 to transfer a developed toner image onto paper. Photosensitive drum 4 and transfer drum 10 are made to rotate synchronously by drum drive motor 22.

Developing unit 6 of copier 1 is equipped with magenta developing member 6M that performs developing using magenta toner, cyan developing member 6C that performs developing using cyan toner, yellow developing member 6Y that performs developing using yellow toner, and black developing member 6K that performs developing using black toner, and a toner hopper (not shown in the drawings) is placed above each developing member to provide toner in the appropriate color (M, C, Y, K).

Developing unit 6 is located such that it can move vertically to allow each developing member to be alternately placed at the developing position. Developing unit 6 is moved by developing unit motor 61.

The housing/feeding mechanism comprises three paper cassettes 42, 43 and 44 that can house paper of different sizes and paper feed system 40 driven by main motor 41.

Paper cassettes 42 through 44 are each capable of holding several hundred sheets of paper. Paper feed system 40 feeds paper alternately from whichever of said cassettes 42 through 44 has been selected, and re-feeds paper that has passed fusing device 48 to the transfer position if necessary.

During full-color copying, paper pulled from one of paper cassettes 42 through 44 is conveyed by a roller unit including pair of timing rollers 45 and wound around transfer drum 10. The paper onto which toner images of four different colors are sequentially transferred is separated from transfer drum 10 by separating claw 18, and then sent to fusing device 48 by feeding belt 47. After fusing, the paper is discharged to paper discharge tray 49.

During two-sided copying, after fusing for the first side, the paper is stored temporarily in interim tray 50 by means of claws 53 and 54, and is then re-fed from interim tray 50 to transfer drum 10 so that the side opposite to the side on which a copy image has been fused becomes the transfer surface. Where multiple originals are to be copied onto a single sheet of paper, etc., the paper is stored temporarily in interim tray 50 after fusing through switch-back feeding via claws 53 and 54 and paper reversal device 51, and then is re-fed so that the side of the paper having the copy image becomes the transfer side.

Paper holding charger 11, pressing roller 12, transfer charger 14, separation chargers 16 and 17 and reference position sensor 13 that outputs reference position signals for transfer drum 10 are located around transfer drum 10.

Actuator plate 13a used to activate reference position sensor 13 is affixed to the surface of transfer drum 10. Reference position signals are used to perform timing adjustment for the linked operation of image reader unit IR and printer unit PR.

The operation of copier 1 is performed by means of operation panel 70 located on the top of image reader unit IR and tablet-type editor 90.

Figure 2:
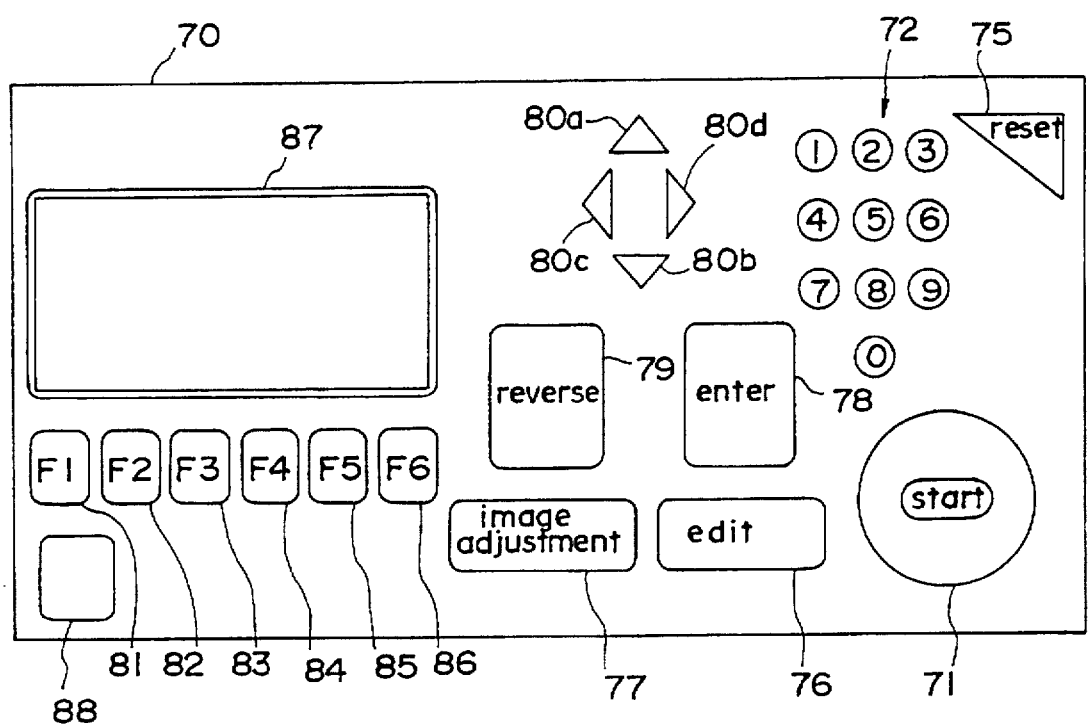
FIG. 2 is a plan view of an operation panel.
Figure 3:
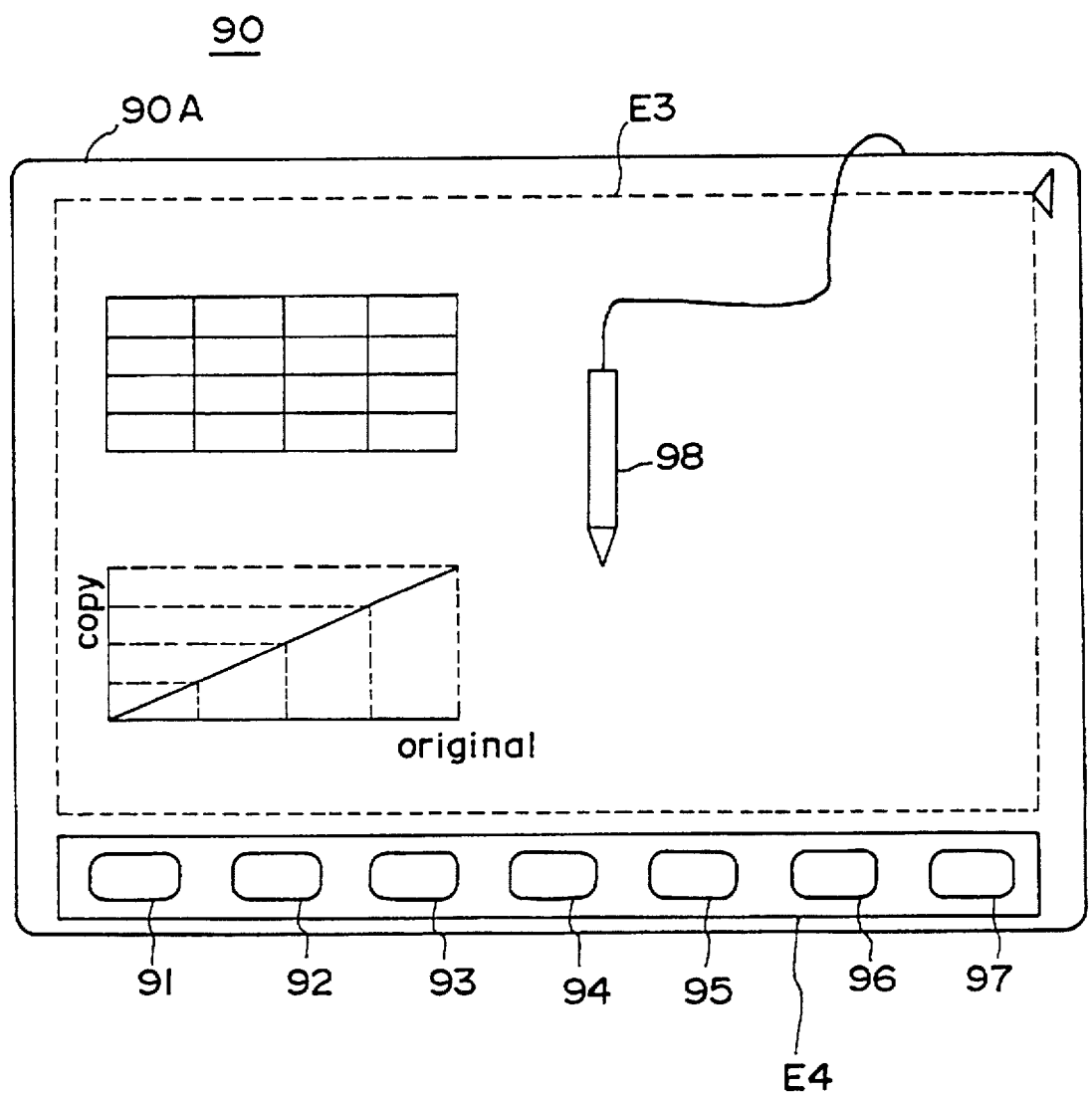
FIG. 3 is a plan view of an editor.

FIG. 2 is a plan view of operation panel 70, and FIG. 3 is a plan view of editor 90.

In FIG. 2, operation panel 70 has, in addition to liquid crystal display (LCD) 87 to perform screen display for interactive operation, start key 71, 10-key keypad 72, panel reset key 75, edit key 76, image quality adjustment key 77, enter key 78, reverse key 79, cursor keys 80a through 80d corresponding to the four directions of up, down, left and right, six function keys 81 through 86 and user choice key 88. The functions of these keys are made clear where necessary in the explanation below.

In FIG. 3, editor 90 comprises plate-shaped main unit 90A and pen 98 to perform position designation. Main unit 90A also works to cover originals, and its operation surface comprises coordinate input area E3 that allows position designation for maximum paper size A3 and function selection area E4 on which are located buttons 91 through 97 to perform function selection. In editor 90, the upper right corner of coordinate input area E3 is deemed the coordinate input reference point (the point of origin for X-Y coordinates).

Figure 4:
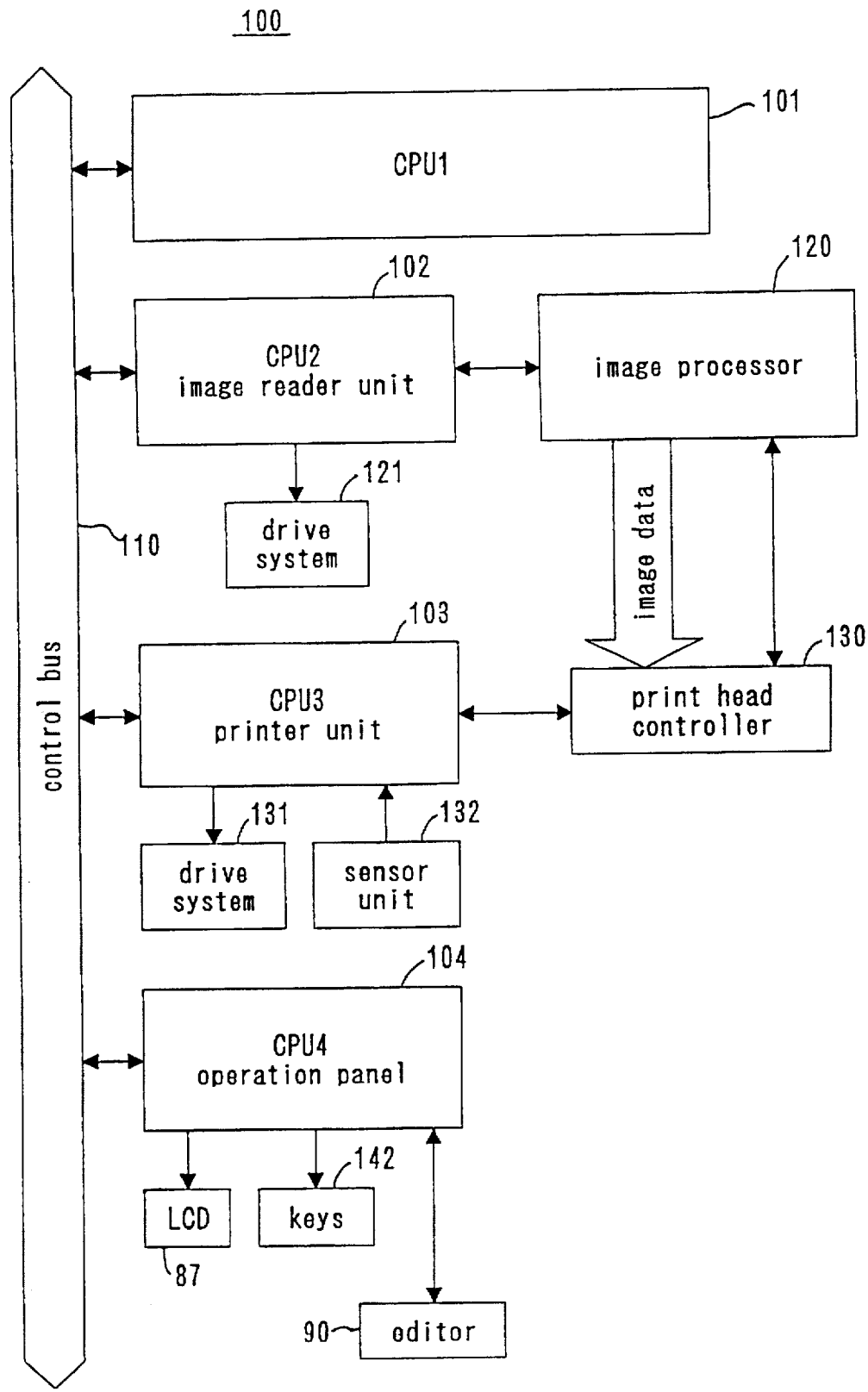
FIG. 4 is a block diagram showing the construction of a control system of the copier.

FIG. 4 is a block diagram showing the construction of control system 100 of copier 1.

Control system 100 mainly comprises four CPUs (central processing units) 101 through 104 and control bus 110 to which each CPU is linked. Each CPU comprises a microprocessor unit (MPU).

First, CPU 102 is responsible for controlling image reader unit IR. In other words, while communicating with image processor 120, CPU 102 controls drive system 121 that comprises a motor, exposure lamp, etc., used to perform scanning of the original.

CPU 103 is responsible for controlling printer unit PR, and outputs prescribed control signals to drive system 131 that includes main motor 41, developing unit motor 61, etc., and to print head controller (PH controller) 130, based on detection signals from sensor unit 132.

CPU 104 is responsible for controlling operation panel 70 and editor 90, and in addition to processing inputs from keys 142 on operation panel 70 and editor 90, it controls the display on LCD 87. CPU 101 is an MSC (Macro System Controller) that performs control for copier 1 as a whole. It issues prescribed commands in accordance with the various operation modes to CPUs 102 through 104, and receives data from each of said CPUs where necessary.

In control system 100, the operations of CPUs 102 through 104 are sequentially controlled by CPU 101 in principle in this way. However, where signals sent and received between image reader unit IR and printer unit PR are required to be high-speed signals, the sending and receiving of said signals is not handled by CPU 101 but is done directly.

Figure 5:
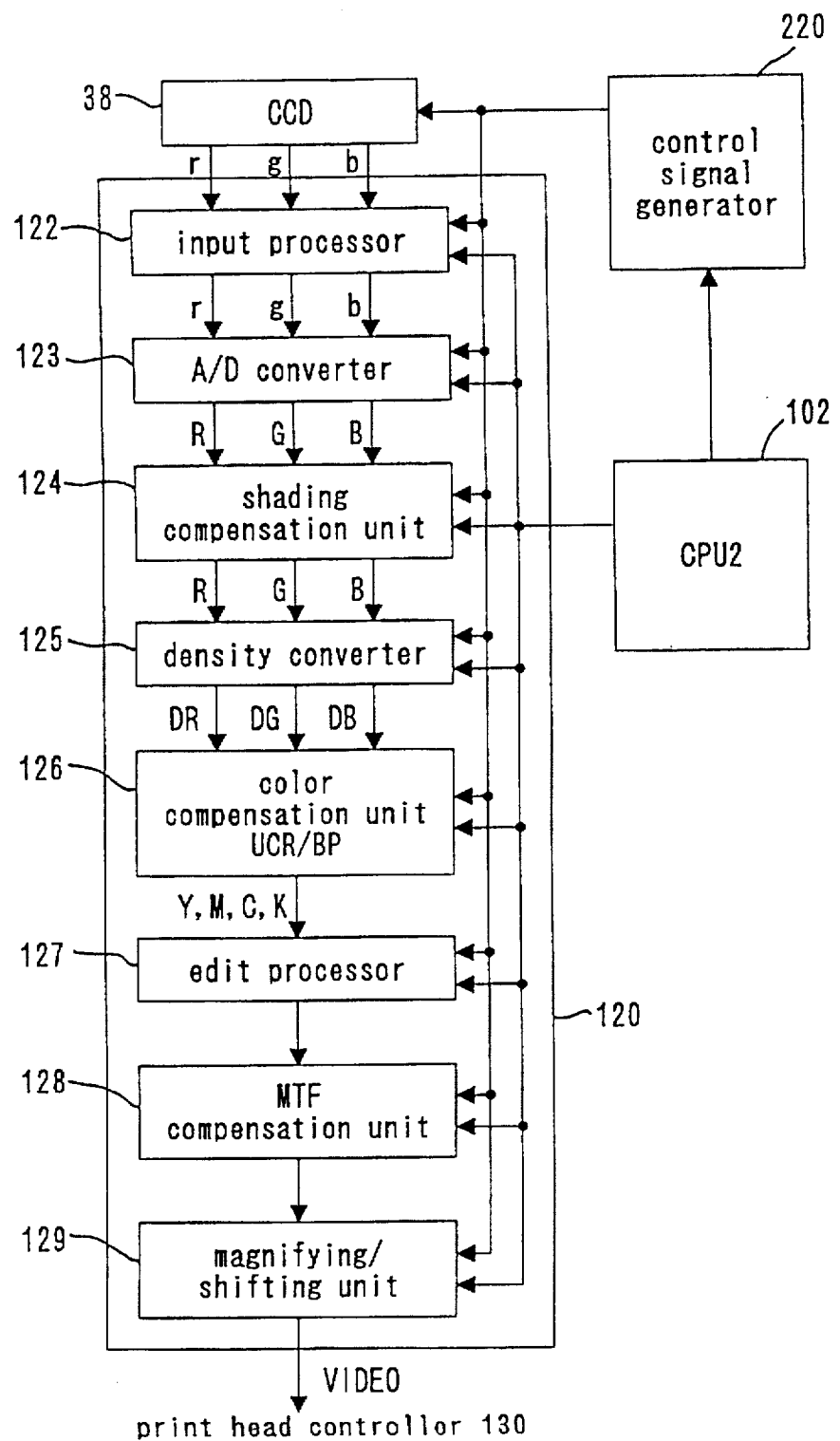
FIG. 5 is a block diagram showing a summary construction of an image processor.

FIG. 5 is a block diagram showing a summary construction of image processor 120.

Image processor 120 comprises input processor 122, A/D converter 123, shading correction unit 124, density converter 125, color correction unit 126, editor 127, MTF correction unit 128 and magnifying/shifting unit 129. Each of these members 122 through 129 operates according to clock signals from control signal generator 220 and control signals from CPU 102.

Input processor 122 performs sampling at fixed cycles of photoelectric conversion signals input from image sensor 38 after they are amplified to a prescribed level. A/D converter 123 carries out quantization of the sampling value from input processor 122 and generates 8-bit (256 gradations) image data for each color R, G and B.

Shading correction unit 124 performs correction regarding the image data for each color based on the variation in light distribution of exposure lamp 33 and in the sensitivity among the pixels of image sensor 38.

Density converter 125 converts image data input from shading correction unit 124, which is data that reflects the proportion of the amount of reflected light, into data that reflects the proportion of each color density (density data), and simultaneously performs enhancement of highlighted and shadowed areas.

Color correction unit 126 generates and outputs image data that corresponds to one of the four toner colors (Y, M, C, K) based on image data in three colors (R, G, B), using three types of publicly known image processing methods for full-color reproduction, i.e., (i) BP processing or generation of a black version, in which dark components to be reproduced in K or black toner are extracted from the color components of the original, (ii) UCR processing or removal of background color, in which dark components are removed from the color components of the original, and (iii) color correction masking processing, in which the proportions among M, C and Y are determined taking into consideration the spectral absorption characteristics of the toners. When this is done, control signals indicating the color for which image data is to be generated are provided to color correction unit 126 by CPU 102 synchronously with the operation of printer unit PR.

Edit unit 127 performs prescribed processing when various types of editing and copying are carried out. MTF correction unit 128 performs image improvement such as edge enhancement and smoothing. Magnifying/shifting unit 129 then performs size conversion to enlarge or reduce the image in accordance with the copy magnification (pixel density conversion in the main scanning direction), as well as processing to move the image in the direction of main scanning (image shift) or processing for multiple copying (image repeat) where necessary, and then sends the processed image data VIDEO to print head controller 130.

Figure 6:
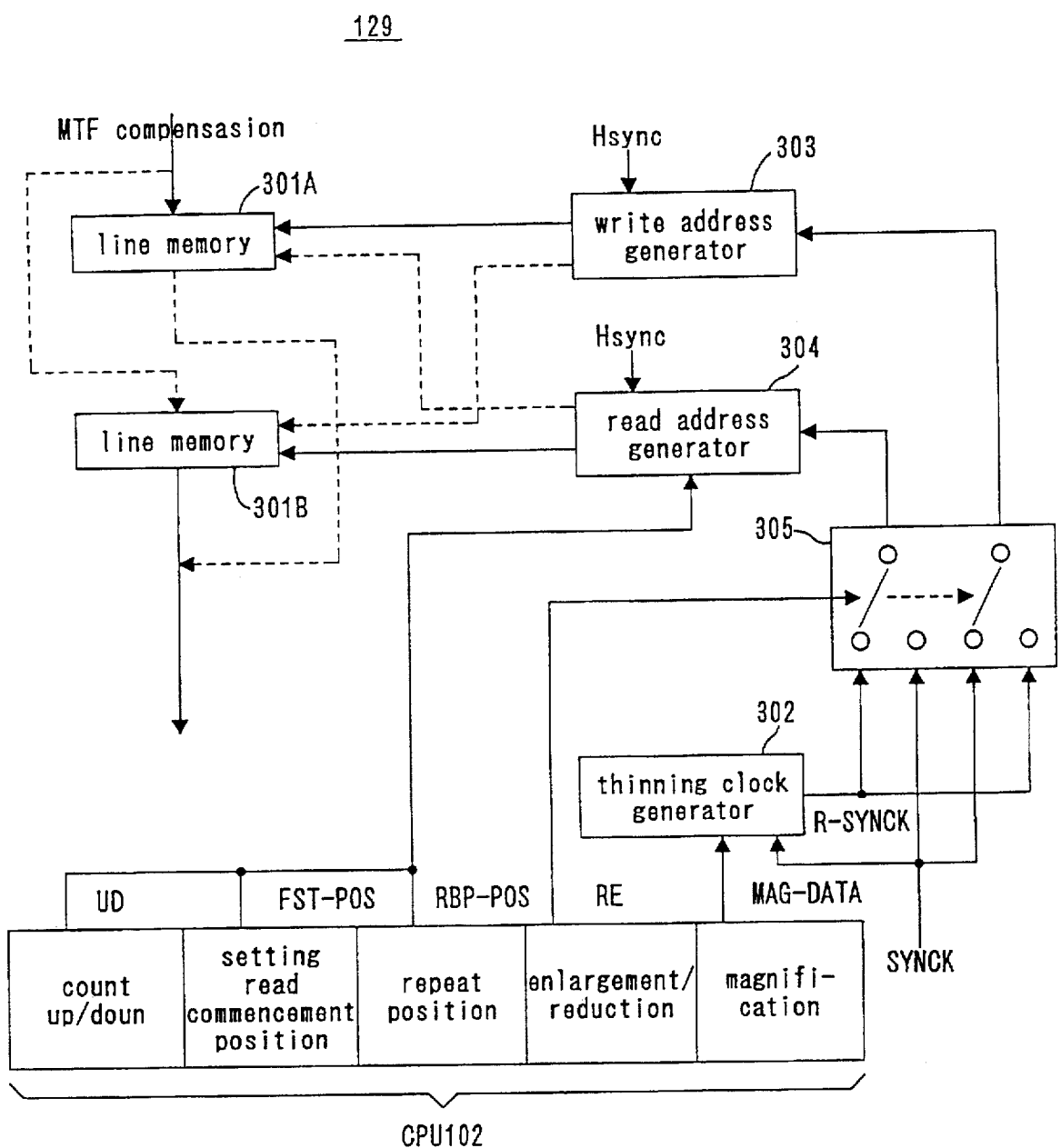
FIG. 6 is a block diagram showing one example of the construction of the magnifying/shifting unit of FIG. 5.
Figure 7A:
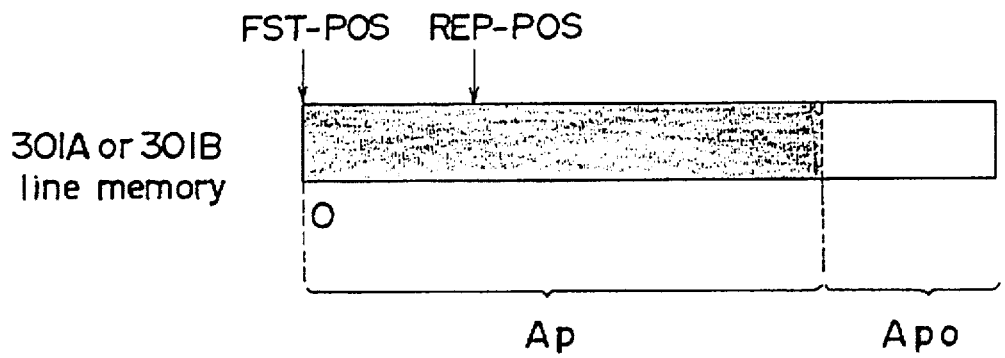
FIG. 7 shows one example of image repeat copying.
Figure 7B:
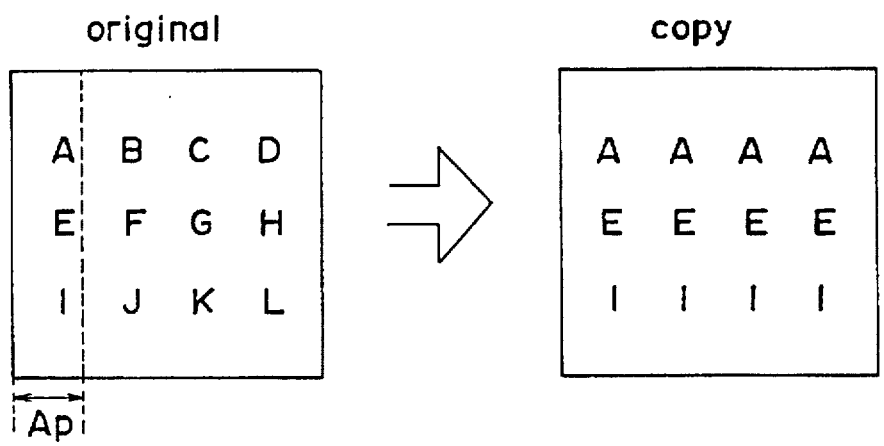

FIG. 6 is a block diagram showing one example of the construction of magnifying/shifting unit 129 in FIG. 5, and FIG. 7 shows one example of image repeat copying.

Magnifying/shifting unit 129 comprises two line memories 301A and 301B, thinning clock generator 302, write address generator 303, read address generator 304 and clock selector 305.

Image data input from MTF correction unit 128 is stored in one line memory (e.g., line memory 301A). When this takes place, line memory 301A is subject to address control by means of write address generator 303.

At the same time, the previously stored image data is read out from the other line memory 301B. When this takes place, line memory 301B is subject to address control by means of read address generator 304.

Address generator 303 and address generator 304 generate write addresses and read addresses, respectively, by counting clock signals selected by clock selector 305.

Clock selector 305 selects and inputs pixel transfer clock signals SYNCK or thinning clock signals R-SYNCK. Thinning clock signals R-SYNCK are generated by thinning clock generator 302 through thinning pixel transfer clock signals SYNCK in accordance with magnification data MAG-DATA provided by CPU 102. In the case of no-magnification copying (copy magnification of 1), clock signals R-SYNCK are signals having the same cycle as clock signals SYNCK. The selection operation for clock selector 305 obeys the enlargement/reduction signals RE provided by CPU 102.

The connections between line memories 301A and 301B and address generators 303 and 304 alternate each time that horizontal synchronous signal Hsync is input. In other words, writing to and reading from line memories 301A and 301B are alternately performed each time signal Hsync is input.

The initial clock signal count value of write address generator 303 is '0'. On the other hand, the initial clock signal count value of read address generator 304 is changed in accordance with read start position data FST-POS, and increases or decreases in accordance with signal UD. Read address generator 304 repeats the counting of a prescribed number of clock signals in accordance with repeat position data REP-POS.

In the case of enlargement copying, pixel transfer clock signals SYNCK are selected as the write clock signals, and thinning clock signals R-SYNCK are selected as the read clock signals. In this way, the same data is read out repeatedly from the line memory synchronously with pixel transmission clocks SYNCK. As a result, the original image is enlarged. In the case of reduction copying, thinning clock signals R-SYNCK are selected as the write clock signals, and the input image data is thinned and stored in the line memory. The thinned image data is then read out synchronously with pixel transfer clock signals SYNCK. As a result, the original image is reduced.

In the case of image repeat copying, when the count value of read address generator 304 (the read address) reaches the value of repeat position data REP-POS, counting begins once again from the initial value, as a result of which a part of the original image is repeatedly copied, as shown in FIG. 7. When this takes place, repeat position data REP-POS is set at a value within address range Ap of the line memory which can be read in one line cycle. By setting read start position data FST-POS and repeat position data REP-POS appropriately, repeated copying of a desired portion in the main scanning direction may be performed. If the total number of repetitions is set as 1, trimming copying results. In normal copying, repeat position data REP-POS is set at a value within address range Apo which is outside address range Ap.

Next, trimming monitor copying, which is unique to this invention, will be explained.

Trimming monitor copying resembles image repeat copying in terms of the operation and control of copier 1. The difference between the two types of copying is that in image repeat copying one part of the original is repeatedly printed out on one sheet of paper, while in trimming monitor copying different parts of the original (including partially overlapping areas) are printed out on one sheet of paper.

Figure 8:
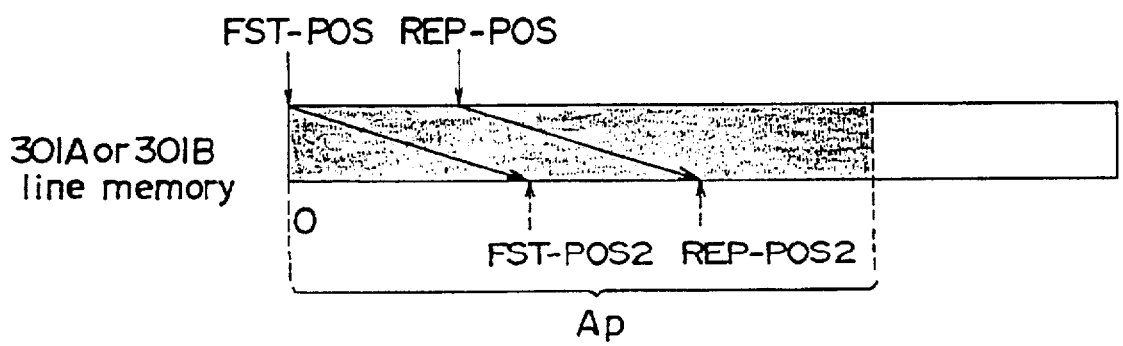
FIG. 8 is a simplified drawing showing the memory control for trimming monitor copying.

FIG. 8 is a simplified drawing of the memory control for trimming monitor copying.

As shown in FIG. 8, in trimming monitor copying, first, as in image repeat copying, data in the address range from read start position data FST-POS to repeat position data REP-POS is read out from either line memory 301A or 301B. Next, read start position data FST-POS and repeat position data REP-POS are both shifted by the same amount, and data is read out from the line memory again. By changing the read addresses and repeating reading access to line memory 301A or 301B, the trimming area can be shifted in the direction of main scanning.

Figure 9:
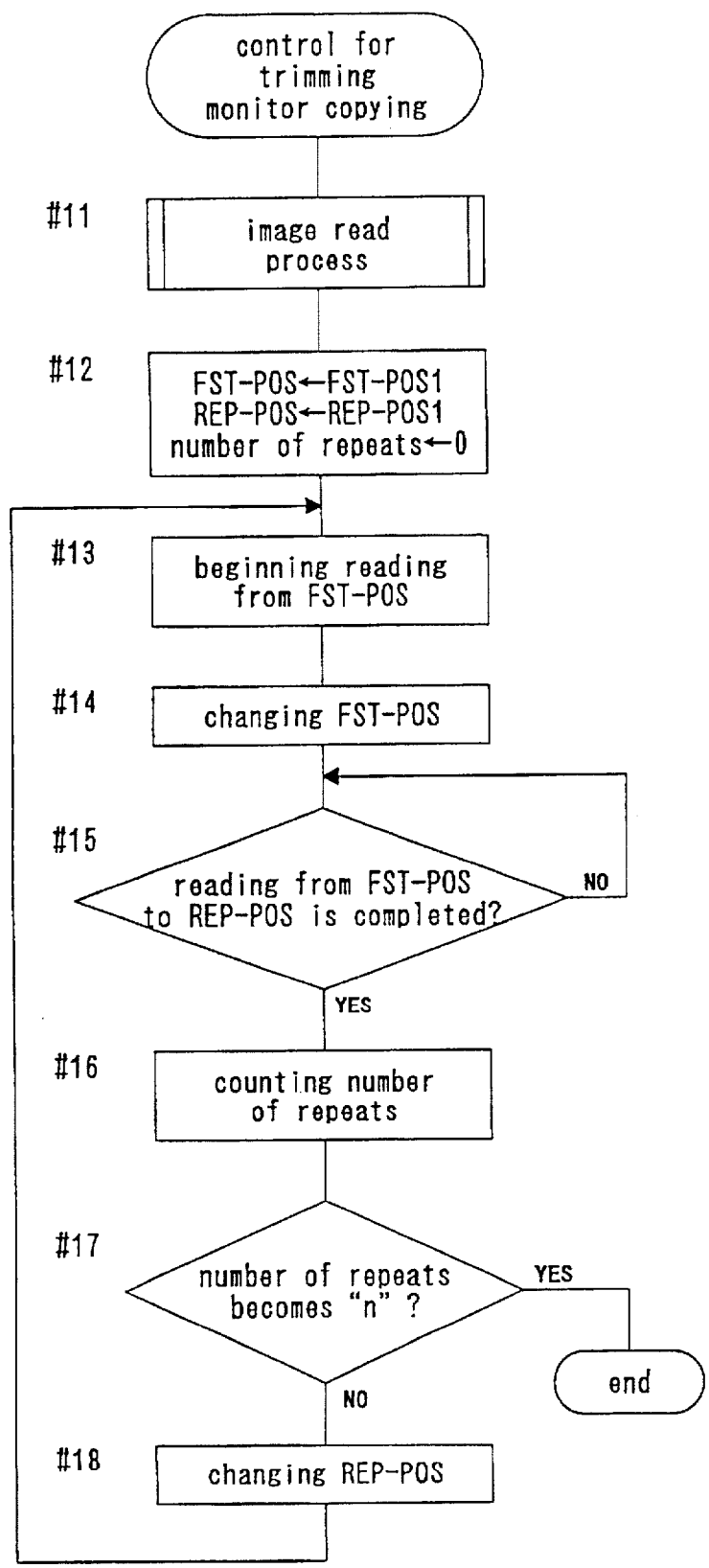
FIG. 9 is a flow chart showing the sequence of the memory control for trimming monitor copying.
Figure 10:
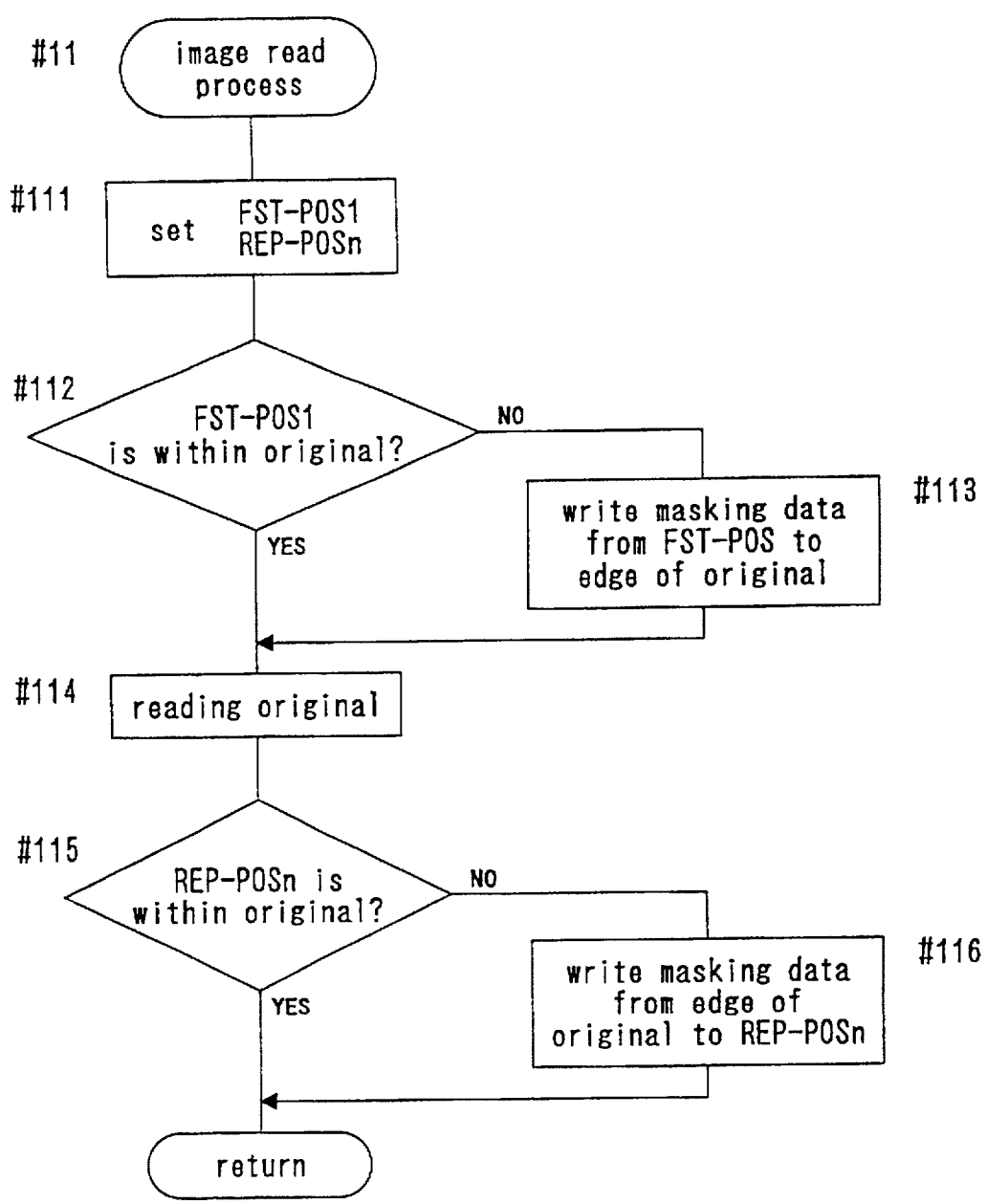
FIG. 10 is a flow chart showing the sequence of the image reading process of FIG. 9.

FIG. 9 is a flow chart showing the sequence of the memory control for trimming monitor copying, and FIG. 10 is a flow chart showing the sequence of the image read process of FIG. 9.

The size of the trimming area (length in the main scanning direction), the amount of shift of the trimming area, and the number of repeats are set through operation by the user (operator) as conditions of operation.

CPU 102 writes image data output from MTF correction unit 128 to line memory 301A of magnifying/shifting unit 129 (#11). When this takes place, it is necessary to store the image relating to the copying range from top position FST-POS1 of the first trimming area in the main scanning direction to the bottom position REP-POSn of the final, or nth, trimming area. Where the copying range is larger than the original, dummy masking data (white) is written regarding the part that does not correspond to the original (See FIG. 10.)

When writing of one line of the original that was scanned is completed, reading from line memory 301A is performed together with writing to other line memory 301B.

When this reading is performed, first, FST-POS1 is set as the value of read start position data FST-POS, REP-POS1 is set as the value of repeat position data REP-POS, and the number of repeats is reset to initial value '0' (#12).

Read access in which read start position data FST-POS is deemed the top address is begun (#13), and read start position data FST-POS is then changed to second trimming area top position FST-POS2 (#14).

When reading from FST-POS1 to REP-POS1 is completed (#15), the number of repeats is increased by 1 (#16), and when the number of repeats becomes n, this routine is ended (#17). Where the number of repeats has not become n, repeat position data REP-POS is changed to second trimming area bottom position REP-POS2 (#18), at which point step #13 is returned to and the reading of data corresponding to the second trimming area is performed. Subsequently, the processes of steps #13 through #18 are repeated up to the number of repeats in the same way.

By repeatedly shifting the address designation range by a certain amount and performing multiple reads during the scanning of one line of original D in this way, multiple copy images corresponding to multiple areas of original D that are different from one another but have uniform dimensions can be printed alongside one another on one sheet of paper. By performing multiple scanning sessions of the same original D and delaying the reading from line memory 301A or 301B each time by a certain amount of time from the standard timing, multiple copy images may be printed on a sheet of paper along the secondary scanning direction.

In other words, by combining address change control regarding line memories 301A and 301B with timing change control, m×n copy images may be printed on one sheet of paper.

Next, the setting of conditions for trimming monitor copying will be explained.

As methods to designate the amount of shift of the trimming frame and the number of repeats, two methods are given.

The first is a method in which values are input via the 10-key keypad for both the amount of shift and the number of repeats with respect to both the main scanning direction and secondary scanning direction. This method regards trimming monitor copying as one type of image repeat copying, and is useful in conveying the feeling of activity and movement.

The second is a method in which the user designates only one reference trimming frame, and the shift amount and number of repeats are then automatically designated by the control system. Using this method, the user can easily obtain the desired reference information for determining the best composition.

Copying using the second method is discussed below.

Figure 11A:
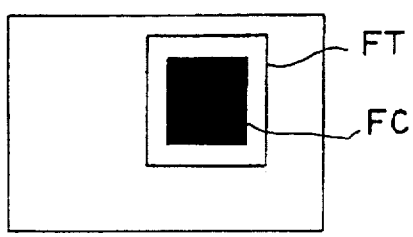
FIG. 11 is a simplified drawing showing one example of trimming monitor copying.
Figure 11B:
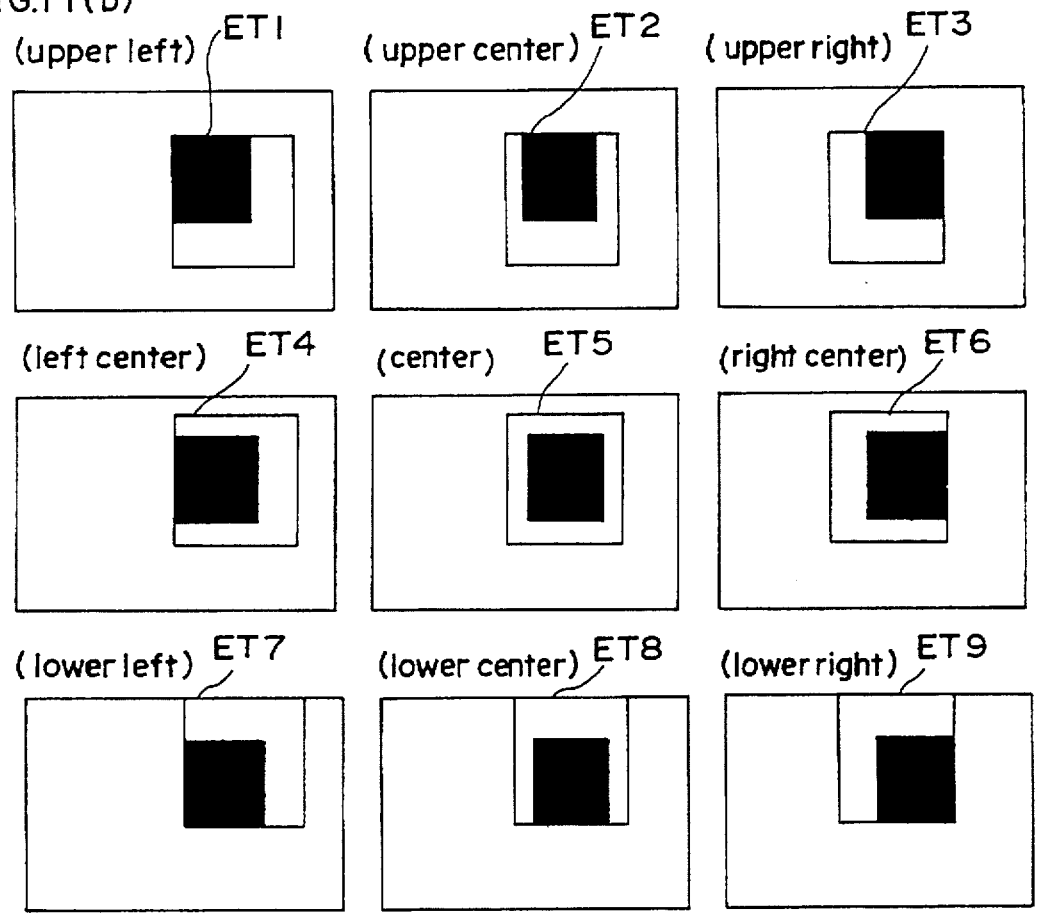
Figure 11C:
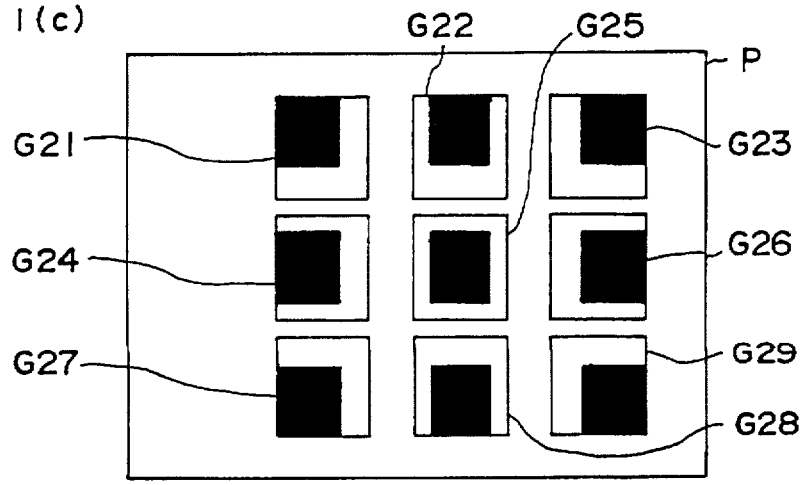

FIG. 11 is a simplified drawing showing one example of trimming monitor copying.

As shown in FIG. 11(a), the user designates trimming frame FT having a desired size and center frame FC by employing editor 90, for example. Center frame FC indicates the main part of the composition which contains the main information to be extracted from the original.

When trimming frame FT and center frame FC are designated, nine trimming areas ET1 through ET9 are automatically set, as shown in FIG. 11(b). Each trimming area ET1 through ET9 is an area in which a part of the original is extracted so that center frame FC is positioned at either the upper left, upper center, upper right, left center, center, right center, lower left, lower center or lower rights.

Nine copy images G21 through G29 corresponding to trimming areas ET1 through ET9 are printed on paper P alongside one another, for example, in three rows and three columns. The user may designate the extraction range for subsequent trimming copying by selecting one image from copy images G21 through G29 in accordance with the display on LCD 87.

Figure 12:
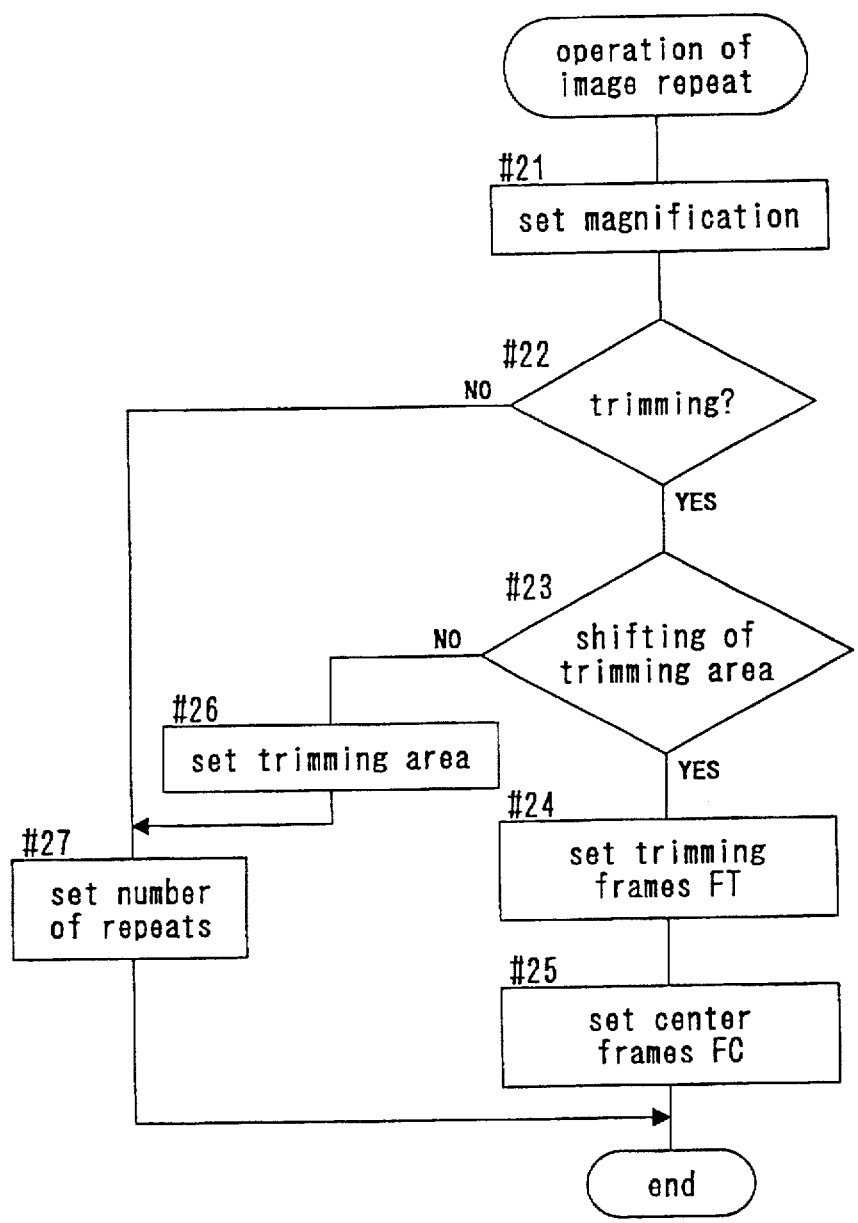
FIG. 12 is a flow chart showing one example of the operation sequence.

FIG. 12 is a flow chart showing one example of the operation sequence, and FIG. 13 is a drawing showing the display screen corresponding to FIG. 12.

Figure 13A:
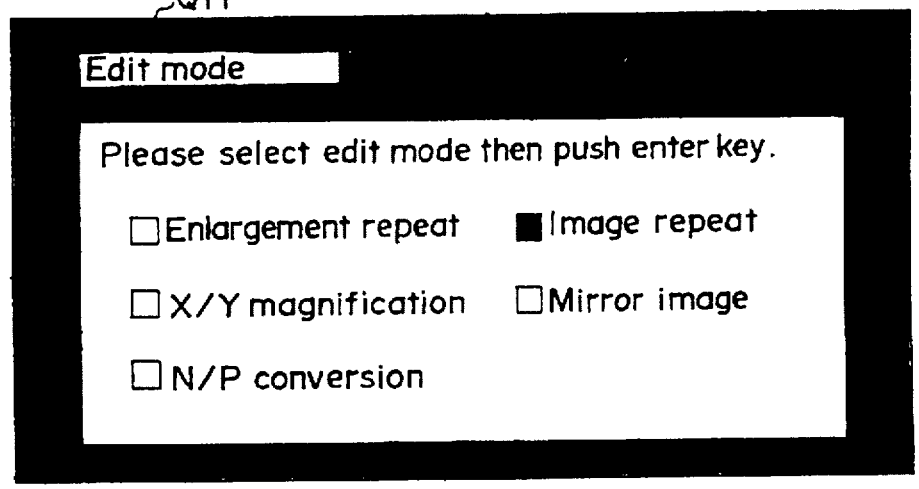
FIG. 13 is a drawing showing the display screen corresponding to FIG. 12.

When the user presses edit key 76 on operation panel OP, edit menu screen Q11 shown in FIG. 13(a) is displayed by means of LCD 87. The user selects image repeat copying by appropriately operating cursor keys 80a through 80d. The blackened square in the drawing indicates that image repeat copying has been selected. When enter key 78 is pressed, image repeat copying mode is entered.

Copier 1 has the following image repeat copy modes: a mode in which copying of the entire image of the original is repeatedly performed, a mode in which a part of the image of the original is trimmed and repeatedly copied, and a mode in which different parts of the image of the original are trimmed and copied (trimming monitor copy mode).

Figure 13B:
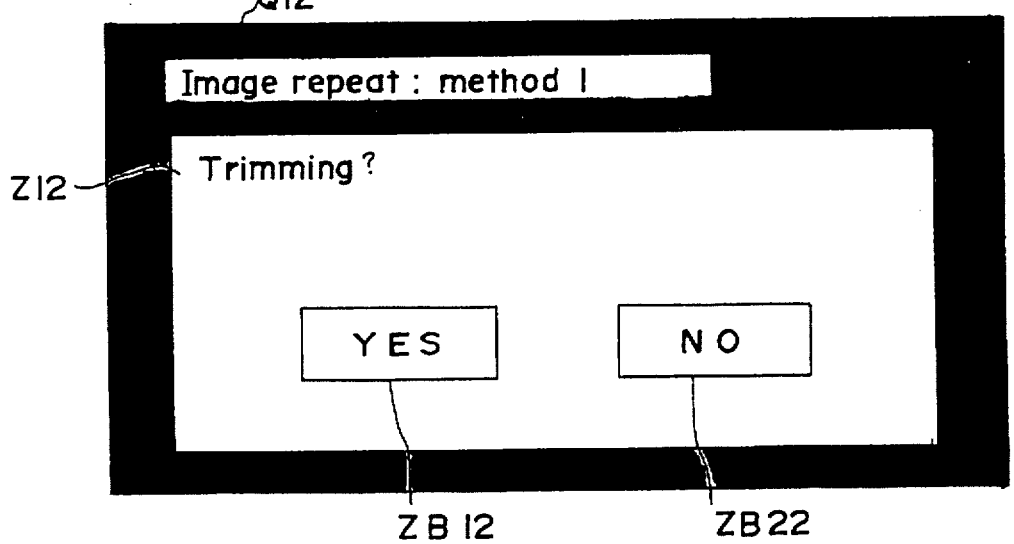

As shown in FIG. 12, in image repeat copy mode, copy magnification is designated irrespective of which of the three modes is present. When the copy magnification is designated and enter key 78 pressed, selection screen Q12 shown in FIG. 13(b) is displayed. The user then selects whether or not trimming is necessary in response to message Z12 on selection screen Q12 (#22).

If button ZB22 is pressed and 'trimming not necessary' is selected (#22), the mode in which the entire original is repeatedly copied is entered. In this case, the number of repeats is input, which completes the setting operation (#27).

Figure 13C:
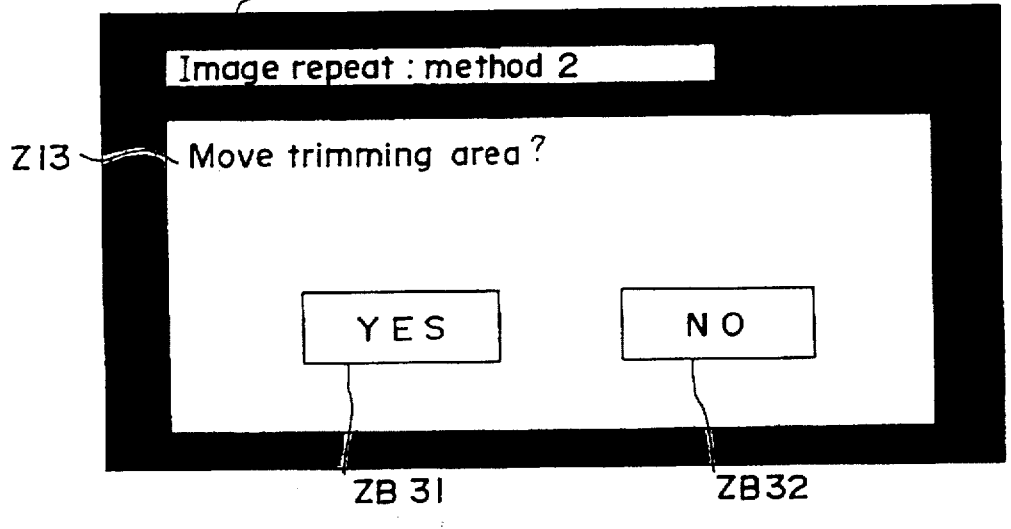

If button ZB12 is pressed and 'trimming necessary' is selected (#22), selection screen Q13 shown in FIG. 13(c) is displayed. The user then selects whether or not shifting of the trimming area is necessary in response to message Z13 on selection screen Q13 (#23).

Where shifting of the trimming area is not necessary, button ZB32 is pressed. By doing so, the mode in which a part of the image of the original is trimmed is entered. In this case, the trimming area is designated using editor 90 (#26), and the number of repeats is input, which completes the setting operation (#27).

Where shifting of the trimming area is necessary, button ZB31 is pressed. By doing so, trimming monitor copy mode is entered. In this case, trimming frames FT and center frames FC are sequentially designated using editor 90 (#24, #25).

After this series of operations, controller 100 calculates the paper conditions (the size and number of sheets of paper to be used) under which the maximum number of copy images may be printed on one sheet of paper P using a publicly known calculation method, based on the size of the original, the copy magnification, and the number of repeats.

In the explanation provided above, the sizes of trimming frames FT were deemed fixed, but as another form of image repeat copying, Magnify Frame and Repeat in which the sizes of trimming frames FT are enlarged or reduced each time repeat copying is carried out is also possible. In this case, the repeat conditions (magnifications and number of repeats) may be set in a manual mode in which the user may freely designate the conditions or in an automatic mode in which previously set conditions are designated, and these two modes may be switched from one to the other as well.

By appropriately providing control data (magnification/reduction signals RE and magnification data MAG-DATA) to magnifying/shifting unit 129, Magnify Image and Repeat, in which the magnification of the image of the original is changed for printing each time repeat copying is carried out, may be achieved.

In other words, image repeat copying may be classified into eight forms depending on the existence or non-existence of trimming, shifting of trimming frame FT (frame shifting), magnification of trimming frames FT (frame magnification) and magnification of the copy images (image magnification), as shown in Table 1. In the table, symbol O indicates 'exists', while symbol X indicates 'does not exist'. In table 1, copy forms are classified assuming that where frame shifting is performed, the frame magnification is not changed. Naturally, where trimming is not performed, frame shifting and frame magnification do not apply.

Figure 14:
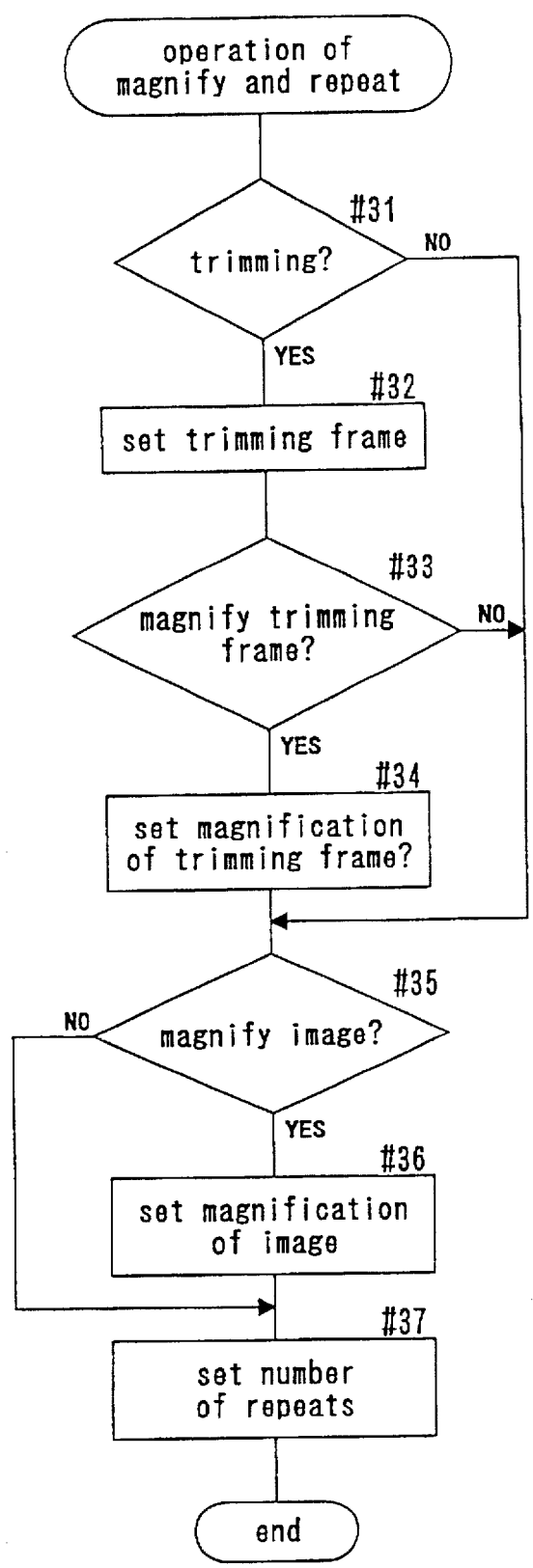
FIG. 14 is a flow chart showing one example of the operation sequence where Magnify and Repeat is being performed.

FIG. 14 is a flow chart showing one example of the operation sequence where Magnify and Repeat is performed. FIG. 15 is a simplified drawing showing an example of Magnify and Repeat. Magnify and Repeat means image repeat copying in which, at minimum, either the frame magnification or the image magnification is changed.

As described above, the user presses edit key 76, calling up edit menu screen Q11 (see FIG. 13(a)), and selects image repeat copying.

In image repeat copying mode, first, it is selected whether or not trimming is necessary (#31). Where trimming is not necessary, it is selected whether or not image magnification is necessary (#35). Where image magnification is desired, the magnifications and the number of repeats are set, completing the repeat conditions designation operation. (#36, #37). Where image magnification is not necessary, only the number of repeats is set, completing the repeat conditions designation operation.

On the other hand, where trimming is necessary, trimming frames FT are set using editor 90, etc. If frame shifting is desired, the shifting conditions are set by designating center frame FC or by inputting shifting amount, as described above. Frame shifting is not performed in this example.

Following the setting of trimming frames FT, it is selected whether or not frame magnification is necessary (#33). If frame magnification is not necessary, the image magnifications are set as necessary and the number of repeats is then set. If frame magnification is necessary, the frame magnifications are set (#34), and the image magnifications are then set as necessary. The number of repeats is then set, completing the image repeat copying conditions designation operation.

The examples in FIG. 15 show cases in which trimming of the original is performed and a total of three copy images are printed.

The user designates trimming frame FT1, for example, as shown in FIG. 15(a). Appropriate enlargement magnifications (greater than 1) are then set as the frame magnifications, and the number of repeats is set to 3. Where these settings are made, images of ranges corresponding to the three trimming frames FT1, FT2 and FT3 are then extracted from the original. Where trimming frame FT3 is designated first and appropriate reduction magnifications (less than 1) are set as the frame magnifications, images of ranges corresponding to the three trimming frames FT1, FT2 and FT3 are then extracted from the original in the same way.

Where the image magnifications are set such that the sizes of trimming frames FT1, FT2 and FT3 are the same, three equal-sized copy images G31, G32a and G33a that correspond to trimming frames FT1, FT2 and FT3 are printed alongside one another on paper P, as shown in FIG. 15(b). The form of copying shown in FIG. 15(b) is useful for determining the best composition. It is not necessary to have copy image G31 corresponding to reference trimming frame FT1 be of the same magnification: it may be either enlarged or reduced. Where copy image G31 is a magnified image, naturally the accompanying copy images G32a and G33a are also magnified.

When 'not necessary' is selected for image magnification during designation operation ('NO' in step #35), three different-sized copy images G31, G32 and G33 corresponding to trimming frames FT1, FT2 and FT3 are printed alongside one another on paper P. The form of copying shown in FIG. 15(c) can also be used for determining the best composition and making trimming samples.

Where 'not necessary' is selected for frame magnification and 'necessary' is selected for image magnification, ('NO' in step #33 and 'YES' in step #35), three different-sized copy images G31, G31a and G31b corresponding to trimming frame FT1 are printed alongside one another on paper P, as shown in FIG. 15(d). The form of copying shown in FIG. 15(d) may be used for the development of print size samples and confirmation of the effect of enlargement or reduction, for example.

The embodiment discussed above involved an example of copier 1 in which a latent image for one line is formed parallel to the reading of one line of original D, but where the copier has an image memory (page memory) that can store the image of one page of the original, reading of data may be repeated with the address designation range changed not based on a unit of one line but on a unit of one page, and the trimming area may be moved more freely.

Using the present invention, because multiple copy images having different trimming ranges are printed on one sheet of paper, it is no longer necessary to repeatedly perform trimming copying in order to compare various compositions. In addition, increased variety in image repeat copying may be obtained.

Although the present invention has been fully described by way of examples with reference to the accompanying drawings, it is to be noted that various changes and modifications will be apparent to those skilled in the art.

Therefore, unless otherwise such changes and modifications depart from the scope of the present invention, they should be construed as being included therein.

What is claimed is:

1. An image processing apparatus comprising:
   designating means for designating a portion of an image area;
   outputting means for outputting an image data from an image memory; and
   control means for controlling said outputting means so as to output a first image data and a second image data, said first image data corresponding to the portion designated by said designating means, and said second image data corresponding to a different portion from said designated portion.

2. An image processing apparatus according to claim 1, wherein an image size of said first output image data is equal to an image size of said second output image data.

3. An image processing apparatus according to claim 2, wherein a size of said designated portion is equal to a size of said different portion.

4. An image processing apparatus according to claim 3, wherein said different portion partially overlaps said designated portion.

5. An image processing apparatus according to claim 2, wherein a size of said designated portion is different from a size of said different portion, and at least one of said first and second image data is processed to equalize to the first image data with the second image data in image size.

6. An image processing apparatus according to claim 1, wherein an image size of said first output image data is different from an image size of said second output image data.

7. An image processing apparatus according to claim 6, wherein a size of said designated portion is different from a size of said different portion.

8. An image processing apparatus according to claim 1 further comprising:
   printing means for printing an image on a paper in accordance with the image data which are output by said outputting means.

9. An image processing apparatus according to claim 8, wherein a size of a printed image corresponding to said first image data is equal to a size of a printed image corresponding to said second image data.

10. An image processing apparatus according to claim 9, wherein a size of said designated portion is equal to a size of said different portion.

11. An image processing apparatus according to claim 10, wherein said different portion partially overlaps said designated portion.

12. An image processing apparatus according to claim 9, wherein a size of said designated portion is different from a size of said different portion, and at least one of said first and second image data is processed to equalize to the first image data with the second image data in image size.

13. An image processing apparatus according to claim 9, wherein said printing means prints first and second images on the same surface of the paper.

14. An image processing apparatus according to claim 8, wherein a size of a printed image corresponding to said first image data is different from a size of a printed image corresponding to said second image data.

15. An image processing apparatus according to claim 14, wherein a size of said designated portion is different from a size of said different portion.

16. An image processing apparatus comprising:
    designating means for designating a portion of an image area;
    outputting means for outputting an image data from an image memory;
    control means for controlling said outputting means so as to output a first image data and a second image data, said first image data corresponding to the portion designated by said designating means, and said second image data corresponding to a portion shifted from said designated portion; and
    printing means for printing an image on a paper in accordance with the image data which are output by said outputting means.

17. An image processing apparatus according to claim 16, wherein a size of a printed image corresponding to said first image data is equal to a size of a printed image corresponding to said second image data.

18. An image processing apparatus according to claim 17, wherein a size of the designated portion is equal to a size of the shifted portion.

19. An image processing apparatus according to claim 18, wherein the shifted portion partially overlaps the designated portion.

20. An image processing apparatus comprising:
    designating means for designating a portion of an image area;
    outputting means for outputting an image data from an image memory;
    control means for controlling said outputting means so as to output a first image data and a second image data, said first image data corresponding to the portion designated by said designating means, and said second image data corresponding to a portion which has a different size from a size of the designated portion; and
    printing means for printing an image on a paper in accordance with the image data which are output by said outputting means.

21. An image processing apparatus according to claim 20, wherein a size of a printed image corresponding to said first image data is equal to a size of a printed image corresponding to said second image data, and at least one of said first and second image data is processed to equalize to the first image data with the second image data in image size.

22. An image processing apparatus according to claim 21, wherein a size of said designated portion is different from a size of said magnified portion.

23. An image processing apparatus according to claim 20, wherein a size of a printed image corresponding to said first image data is different from a size of a printed image corresponding to said second image data.

24. A method of processing an image comprising steps of:
    designating a portion of an image area;

first extracting an image data corresponding to said designated portion from image area;

first outputting the image data corresponding to said designated portion;

automatically shifting the designated portion by predetermined amount;

second extracting an image data corresponding to the shifted portion; and second outputting the image data corresponding to the shifted portion.

25. A method of processing an image according to claim 24 further comprising steps of:

first printing the image on a paper in accordance with the image data which are output by first outputting step; and second printing the image on a paper in accordance with the image data which are output by second outputting step.

26. A method of processing an image comprising steps of:

designating a portion of an image area;

first extracting an image data corresponding to said designated portion from image area;

first outputting the image data corresponding to said designated portion;

automatically magnifying the designated portion by predetermined magnification;

second extracting an image data corresponding to the magnified portion; and second outputting the image data corresponding to the magnified portion.

27. A method of processing an image according to claim 26 further comprising steps of:

first printing the image on a paper in accordance with the image data which are output by first outputting step; and second printing the image on a paper in accordance with the image data which are output by second outputting step.

* * * * *